United States Patent [19]

Sheriff

[11] Patent Number: 4,541,325

[45] Date of Patent: Sep. 17, 1985

[54] TELESCOPIC CYLINDER CONSTRUCTION

[75] Inventor: Merle M. Sheriff, Carlsbad, Calif.

[73] Assignee: Hydraulic Technology Corporation, Naples, Fla.

[21] Appl. No.: 577,164

[22] Filed: Feb. 6, 1984

Related U.S. Application Data

[63] Continuation of Ser. No. 294,818, Aug. 20, 1981, abandoned.

[51] Int. Cl.$^4$ .................................... F01B 7/20
[52] U.S. Cl. ............................. 92/52; 92/53; 92/128
[58] Field of Search ................ 92/52, 53, 128, 51

[56] References Cited

U.S. PATENT DOCUMENTS

| | | | |
|---|---|---|---|
| 1,928,533 | 9/1933 | Goss | 92/53 |
| 3,722,375 | 3/1973 | Sierenpiper | 92/53 |
| 3,934,423 | 1/1976 | Haller | 92/52 |
| 4,303,005 | 12/1981 | Glomski | 92/52 |
| 4,323,002 | 4/1982 | Wake | 92/52 |
| 4,339,989 | 7/1982 | Webster | 92/53 |

FOREIGN PATENT DOCUMENTS 128536 11/1928 Switzerland ..................... 92/53

*Primary Examiner*—Abraham Hershkovitz
*Attorney, Agent, or Firm*—Oliver D. Olson

[57] ABSTRACT

A telescopic hydraulic cylinder comprises a hollow base member arranged to be supported pivotally on a mount, as by trunnions, the base member including a removable end closure at its rearward end. The interior surface of the base member incorporates a set of machined grooves which removably mount a set of rings that act as a stop, a fluid seal, a bearing and a wiper for the largest of a plurality of telescoping cylinder stages each incorporating a similar set of internal machined grooves and rings which cooperate with the adjacent smaller stage. The smallest stage receives a piston closed at its forward end which mounts a connector for attachment to a load to be moved. An internal groove on the rearward end of each cylinder stage removably mounts a lifting ring and an external groove on the rearward end of each cylinder stage and piston removably mounts a guide bearing ring for cooperation at its forward end with the stop ring of the adjacent larger cylinder stage and at its rearward end with the lifting ring of the adjacent larger cylinder stage.

4 Claims, 2 Drawing Figures

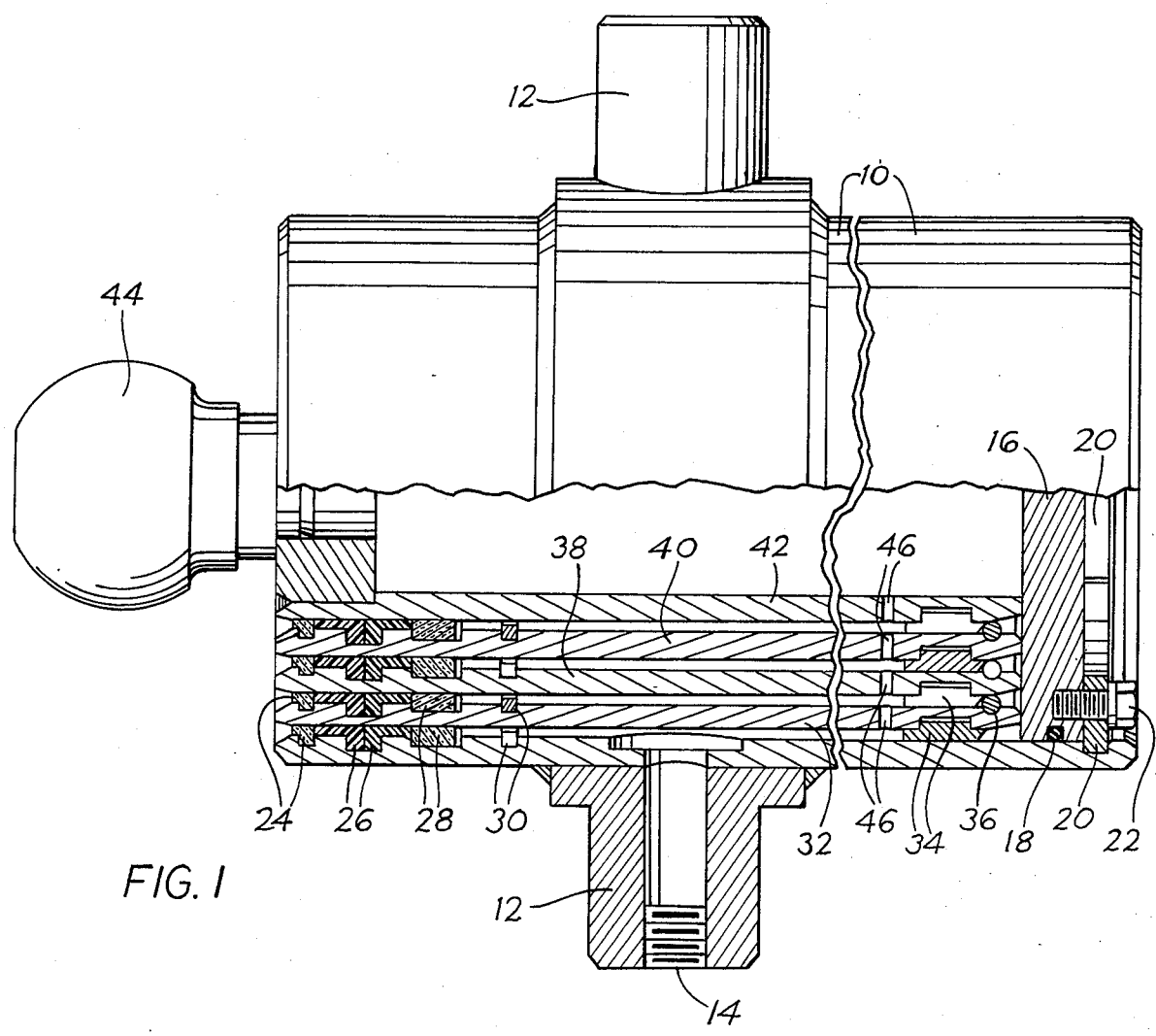
FIG. I
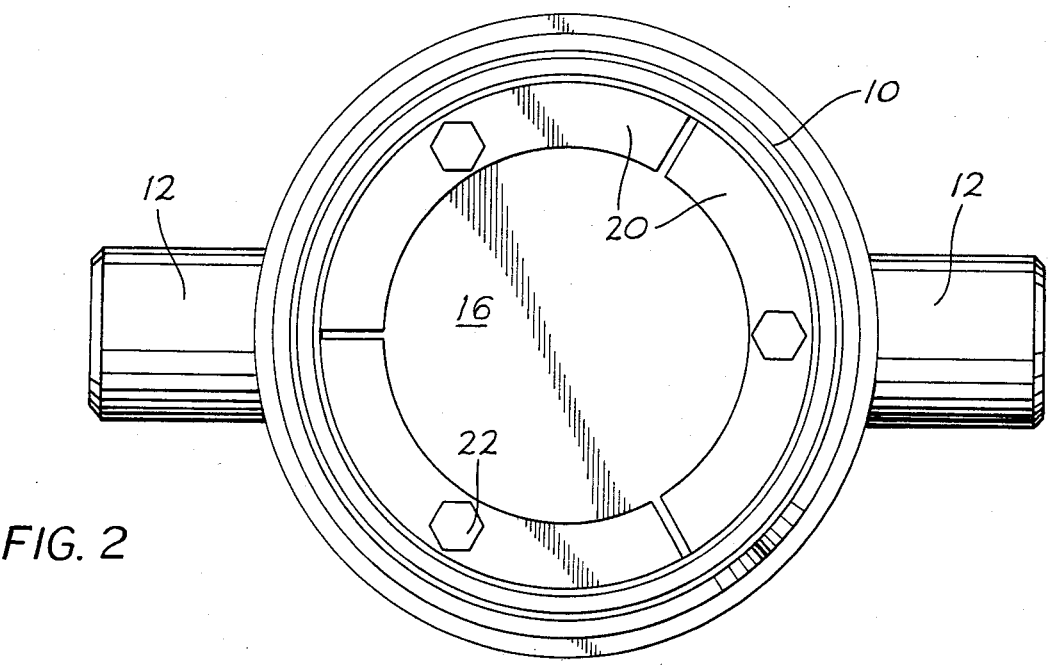
FIG. 2

TELESCOPIC CYLINDER CONSTRUCTION

This application is a continuation of application Ser. No. 294,818, filed Aug. 20, 1981, now abandoned.

BACKGROUND OF THE INVENTION

This invention relates to telescopic hydraulic cylinders, and more particularly to a telescopic hydraulic cylinder construction which provides for the use of thin wall tubing and removably attachable bearing, seal, stop, wiper, guide and lifting rings, thereby eliminating welding, threading and excessive machining of cylinder tubing.

Normally, telescopic hydraulic cylinders are constructed in one of two basic ways. One way is to start with thick wall tubing and form lifting rings, stops and bearing and seal grooves thereon by machining away metal from the tubing, on appropriate inside and outside surfaces of the various cylinder components. A second typical method is to use standard wall tubing and afix by welding, threading or other means, composite annular members shaped to provide lifting rings, stops and bearing and seal grooves.

SUMMARY OF THE INVENTION

In its basic concept, the telescopic hydraulic cylinder of this invention utilizes a plurality of uniform thin wall steel tubings having grooves machined on the inside surface of one end of each of the tubings for the removable mounting of bearing, seal and stop rings, and one internal groove on the opposite end for the removable mounting of lifting ring and one external groove on the same end for the removable mounting of a guide bearing ring.

It is by virtue of the foregoing basic concept that the principal objective of this invention is achieved: namely, the provision of a telescopic hydraulic cylinder construction which avoids the excessive machining and fabrication costs of prior construction methods.

Another object of this invention is to provide a telescopic hydraulic cylinder in which wipers, bearings, seals, stops, guides and lifting rings releasably engage grooves machined on each telescopic tubing, thereby minimizing manufacture, repair and maintenance costs.

A further object of this invention is the provision of a telescopic hydraulic cylinder of the class described which is of simplified construction for economical manufacture.

The foregoing and other objects and advantages of this invention will appear from the following detailed description, taking in connection with the accompanying drawings of a preferred embodiment.

BRIEF DESCRIPTION OF THE DRAWINGS

FIG. 1 is a foreshortened plan view of a telescopic hydraulic cylinder embodying the features of this invention, the same being shown in retracted position, the lower half of the cylinder being in section to disclose details of construction.

FIG. 2 is an end view of the cylinder as seen from the right in FIG. 1.

DESCRIPTION OF THE PREFERRED EMBODIMENT

The telescopic hydraulic cylinder of this invention includes a hollow base member 10 which is secured to any desired suitable mount as by means of the trunnions 12 illustrated. Means for injecting hydraulic fluid into the interior of the base is provided in any conventional way, as by a threaded fluid inlet bore 14 extending through one of the trunnions.

The base member also includes an end closure, or blind head 16 at one end, provided with an annular fluid pressure seal 18. It is held in place removably by a segmented ring 20 seated in an annular groove in the base member and secured to the end closure by bolts 22. The ring may include any number of segments desired.

The opposite end of the base member is machined with plurality of internal ring-receiving grooves. In the embodiment illustrated, there are four such grooves configured, respectively, to removably receive a wiper ring 24, bearing ring 26, seal ring 28 and stop ring 30. The wiper ring is arranged outermost to prevent the entrance of foreign material that might be clinging to the outside surface of the adjacent telescoping stage during its retraction into the base member. The bearing ring is positioned adjacent the wiper ring and is of suitable material for providing a running, guiding fit with the outside surface of the adjacent telescoping stage. The seal ring is of a material to prevent hydraulic fluid leakage between the base member and adjacent telescoping stage during operation of the cylinder. The stop ring is provided inwardly of the seal ring to limit the outward extension of the adjacent telescoping stage, as explained more fully hereinafter.

The telescopic hydraulic cylinder also includes at least one and most often a plurality of telescoping cylinder stages, each configured to be successively smaller in diameter so as to be receivable within the next larger stage. Beginning with the largest stage illustrated, i.e. the cylinder 32 adjacent the base member 10, it is formed of a tubing having an outside diameter substantially equal to the inside diameter of the rings 24, 26 and 28 on the base member. As shown, the cylinder 32 incorporates on its inner surface, adjacent the end opposite the blind head 16 of the base member, four machined grooves for receiving a set of removable rings 24, 26, 28 and 30 similar to those incorporated on the inner surface of the base member 10. In addition, the cylinder 32 includes near its end adjacent the blind head of the base member a groove on its outside surface for receiving a guide bearing ring 34. This ring is arranged for sliding contact with the inside surface of the base member 10.

There is also provided on the inside surface of the cylinder 32, adjacent the blind head 16, a groove arranged to receive a lifting ring 36.

Each of the remaining successively smaller telescoping cylinder stages 38 and 40 illustrated includes the same arrangement of grooves and rings just described.

The innermost tubing 42 constitutes a piston, and it incorporates only a groove at its end adjacent the blind head 16. The groove removably receives a guide bearing ring 34 arranged for abutment with the lifting ring 36 of the adjacent telescoping cylinder stage 40. As illustrated, the piston 42 mounts a connector 44 at its outer end arranged for coupling to a load to be moved, such as the mechanism of a dump truck.

As previously mentioned, the tubings preferably are of a special hydraulic steel tubing drawn over a mandrel to a special tolerances, finishes and eccentricities. With the ring components illustrated and described, this tubing requires no finishing operations on the inside diameter. The only machining required after facing and chamfering the ends is to machine the internal grooves on one end of the base and telescoping cylinder stages for the wiper, bearing, seal and stop rings 24, 26, 28 and 30, respectively; one internal and one external groove on the opposite end of the telescoping cylinder stages 32, 38 and 40 for a guide ring 34 and lifting ring 36; one internal groove on the base member 10 for the locking ring 20; and one external groove on the piston 42 for the guide ring 36. The only other operation is external grinding done on a centerless grinding machine directly without preliminary machining.

Each of the guide rings 34 is a multi-purpose ring preferably made of high strength cast iron and split in two halves. This ring fits in the groove machined on the outside diameter of the telescoping cylinder stages and piston and provides three main functions. First, it functions as a guide sliding directly on the inside diameter of the adjacent outer tubing. Second, it functions as an abutment which, on contact with the stop ring 30 of the adjacent outer tubing, limits the stroke of the stage and takes the full force of the stage as exerted by the hydraulic pressure. Third, it functions as the contact point of the lifting ring 36 of the adjacent outer tubing which takes the full lifting force in the outer direction at the beginning of the stroke.

The guide ring bears against the accurately ground outside surface of the supporting tubing, rather than against the machined bottom of its mounting groove. This assists the ring in providing maximum strength of all components in both directions and good guiding on the mating stage.

Each stop ring 30 is a one piece split ring that acts as the other mating stop point for the associated guide ring 34 at the outer end of the stroke. It preferably is made of nodular iron and is snapped in place in the appropriate groove during assembly.

The bearing rings 26 preferably are of reinforced plastic. They are split and are designed to snap into place in the machined grooves in the tubings. One end of each ring acts as support for the seal ring 28 and the outer end for supporting the wiper ring 24. This arrangement eliminates the need for special devices to hold these components in place.

The lifting rings 36 are spring steel split rings of rather standard design. There are arranged removably in the grooves on the inside surface of the telescoping cylinder stages for abutting contact with the guide bearing rings 34 in the grooves on the outside surface of the adjacent smaller stage.

FIG. 1 shows fluid passage bores 46 extending through the tubing walls of the telescoping cylinder stages and piston adjacent the guide rings 34. These bores permit free passage of hydraulic fluid under pressure into the interiors of these components. Hydraulic fluid also is allowed to pass around the guide rings 34 and lifting rings 36.

Assembly of the telescopic hydraulic cylinder just described is as follows: First, all stop rings, seals, bearings, and wipers are installed in place. Next, the largest cylinder stage 32 is slipped into the base member 10 before the blind head 16 is installed. The next stage 38 then is slipped into the outer stage 32, stage 40 into stage 38, and finally the piston 42 into stage 40. As each stage reaches the guide groove for the guide ring 34 the two halves of the guide ring are put into place and the stage slid into place. Next, the lifting rings 36 are snapped into place and the blind head 16 is installed. Disassembly follows the reverse sequence.

The operation of the telescopic cylinder from the closed position of FIG. 1 is as follows: Hydraulic fluid under pressure in delivered from a source (not shown) to the oil inlet 14 and the internal portions of the cylinder stages and piston are filled with oil under pressure. The various stages which are free to move start to move out of the base member against the opposition of the load applied to the connector 44. The largest stage 32 with the greatest area moves outward first. As it moves, each successive lifting ring 36 contacts the confronting end of the guide ring 34 of the next smaller stage until all of the stages and piston 42 move together to lift the load.

When the abutting edge of the guide ring 34 of the first stage 32 comes in contact with the corresponding stop ring 30 of the base member 10, the first stage comes to a halt. The remaining stages continue to move outward, each stopping when the corresponding guide ring abuts the stop ring carried by the next larger stage, until the piston 42 is fully extended or the oil pressure is shut off. The telescopic cylinder is retracted when the oil inlet is opened to the reservoir of the supply and a load is applied to the piston end. During retraction of the cylinder stages any foreign matter such as dirt or debris clinging to the tubings is prevented from entering the cylinders by the wiping action of the wiper rings 24.

From the foregoing it will be appreciated that this invention provides a telescopic hydraulic cylinder characterized by the absence of welding, threading and excessive machining. This simplified construction is reflected in lower cost of manufacture and maintenance, ease of service and more consistent performance.

It will be understood that this telescopic cylinder construction may utilize any form of fluid pressure, such as pneumatic or the hudraulic pressure exemplified hereinbefore.

It will be further apparent to those skilled in the art that various changes may be made in the size, shape, type, number and arrangement of parts described hereinbefore. For example, the number of internal grooves in the base member and cylinder stages may be greater than four, to accommodate double sets of bearing rings 26 and double stop rings 30 separated by a spacer for very high pressure cylinders. Similarly, additional external grooves may be provided on the cylinders to accommodate double guide bearing rings 34, separated by a spacer, for very high pressure cylinders. These and other changes and modifications may be made without departing from the spirit of this invention and the scope of the appended claims.

Having thus described my invention and the manner in which it may be used, I claim:

1. A telescopic fluid pressure cylinder, comprising:
 (a) a hollow cylindrical base member of substantially uniform wall thickness throughout its length arranged to be mounted for support,
 (b) the base member having an end closure at one end,
 (c) the base member having a fluid pressure passageway for introducing fluid under pressure into the interior of said base member,
 (d) the base member having near its open end a set of longitudinally spaced machined grooves on its interior surface removably mounting a ring set including a stop ring, a seal ring outwardly of the stop ring and a bearing ring outwardly of the seal ring,
 (e) at least one telescoping cylinder stage slidably received through said ring set in the base member, (f) each telescoping cylinder stage being of substantially uniform wall thickness throughout its length and having a set of internal machined grooves near its outer end removably moving a ring set including a stop ring, a seal ring outwardly of the stop ring and a bearing ring outwardly of the seal ring, each cylinder stage also having near its opposite end an internal machined groove removably receiving a lifting ring and an external machined groove removably receiving a guide bearing ring arranged for abutment at its inner end with the lifting ring of the adjacent outer cylinder stage, and at its outer end with the stop ring of the same adjacent outer cylinder stage, and (g) a piston slidably received through the rings in the innermost cylinder stage and having an external machined groove near its inner end removably receiving a guide bearing ring arranged for abutment at its inner end with the lifting ring of the adjacent telescoping cylinder stage.

2. The telescopic fluid pressure cylinder of claim 1 wherein the end closure of the base member is a plate received removably in said base member, and a machined locking groove in the inner surface of the base member removably mounts a locking ring in abutment with the plate.

3. The telescopic fluid pressure cylinder of claim 2 wherein the locking ring comprises a plurality of segments, and bolts secure the segments releasably to the end closure plate.

4. The telescopic fluid pressure cylinder of claim 1 wherein each stop ring is a resilient split annular ring, each lifting ring is a resilient split annular ring, and each guide bearing ring comprises a pair of substantially semicircular segments, each guide bearing ring being arranged at its longitudinally outer end for abutment with the next radially outer stop ring and at its longitudinally inner end for abutment with the next radially outer lifting ring.

* * * * *

UNITED STATES PATENT AND TRADEMARK OFFICE
CERTIFICATE OF CORRECTION

PATENT NO. : 4,541,325
DATED : 17 September 1985
INVENTOR(S) : Merle M. Sheriff

It is certified that error appears in the above–identified patent and that said Letters Patent are hereby corrected as shown below:

Column 5, Line 4, "moving" should read -- mounting -- .

Signed and Sealed this

Twenty-sixth Day of November 1985

[SEAL]

Attest:

Attesting Officer

DONALD J. QUIGG

Commissioner of Patents and Trademarks